US012727619B2

(12) United States Patent
Batista et al.

(10) Patent No.: US 12,727,619 B2
(45) Date of Patent: Sep. 8, 2026

(54) AEROSOL-GENERATING DEVICE WITH SLIDING CONTACTS FOR MULTIPLE INDUCTION COILS

(71) Applicant: Philip Morris Products S.A., Neuchatel (CH)

(72) Inventors: Rui Nuno Batista, Neuchatel (CH); Ricardo Cali, Mannheim (DE); Toney Moses Rajan, Mannheim (DE); Alexandra Sereda, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 483 days.

(21) Appl. No.: 17/998,176

(22) PCT Filed: May 7, 2021

(86) PCT No.: PCT/EP2021/062118
§ 371 (c)(1),
(2) Date: Nov. 8, 2022

(87) PCT Pub. No.: WO2021/228702
PCT Pub. Date: Nov. 18, 2021

(65) Prior Publication Data

US 2023/0225413 A1 Jul. 20, 2023

(30) Foreign Application Priority Data

May 14, 2020 (EP) .................................... 20174668

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/50* (2020.01); *A24F 40/57* (2020.01);
(Continued)

(58) Field of Classification Search
CPC ....... A24F 40/465; H05B 6/108; H05B 6/105; H05B 6/36
See application file for complete search history.

(56) References Cited

U.S. PATENT DOCUMENTS 4,137,491 A * 1/1979 Bartley .................. H02P 25/08 318/685
5,095,921 A 3/1992 Losee et al.
(Continued)

FOREIGN PATENT DOCUMENTS

CN 104095293 B 8/2016
CN 107846983 A 3/2018
(Continued)

OTHER PUBLICATIONS

Translation of CN 104095293 (Year: 2014).*
(Continued)

*Primary Examiner* — Michael H. Wilson
*Assistant Examiner* — Michael Patrick Mullen
(74) *Attorney, Agent, or Firm* — Oblon, McClelland, Maier & Neustadt, L.L.P.

(57) ABSTRACT

An aerosol-generating device is provided, including: at least two heating arrangements, each heating arrangement including a heating coil, first, second, and third contacts, the first contact being arranged contacting a distal end of the heating coil, the second contact being arranged contacting a proximal end of the heating coil, and the third contact being arranged contacting the heating coil between the first and second contacts, and a sliding arrangement, the heating coils
(Continued)

being arranged side by side parallel to a longitudinal axis of the device, the sliding arrangement being arranged adjacent the heating coils and configured to slide parallel to the longitudinal axis and parallel to the heating coils, the third contacts being mounted on the sliding arrangement, and an electrical contact point between each third contact and each respective heating coil being adaptable by sliding the sliding arrangement.

16 Claims, 3 Drawing Sheets

(51) Int. Cl.

| | |
|---|---|
| ***A24F 40/50*** | (2020.01) |
| ***A24F 40/57*** | (2020.01) |
| ***A24F 40/60*** | (2020.01) |
| ***A24F 40/65*** | (2020.01) |
| ***H05B 6/10*** | (2006.01) |
| ***H05B 6/40*** | (2006.01) |
| ***H05B 6/44*** | (2006.01) |

(52) U.S. Cl.

CPC .............. *A24F 40/60* (2020.01); *A24F 40/65* (2020.01); *H05B 6/105* (2013.01); *H05B 6/40* (2013.01); *H05B 6/44* (2013.01)

(56) References Cited

U.S. PATENT DOCUMENTS

| | | | | |
|---|---|---|---|---|
| 2018/0110940 | A1 | 4/2018 | Suzuki et al. | |
| 2019/0053541 | A1 | 2/2019 | Rojo-Calderon | |
| 2019/0124988 | A1 | 5/2019 | Hu et al. | |
| 2019/0289908 | A1 * | 9/2019 | Worm ..................... | A24F 40/30 |

FOREIGN PATENT DOCUMENTS

| | | | | |
|---|---|---|---|---|
| CN | 108135276 | A | 6/2018 | |
| CN | 207754542 | U | 8/2018 | |
| DE | 10103537 | A1 * | 8/2002 | ............ H02K 15/12 |
| EP | 0 488 488 | A1 | 6/1992 | |
| EP | 3 305 103 | A1 | 4/2018 | |
| EP | 3 476 231 | A1 | 5/2019 | |
| JP | S 57-176706 | A | 10/1982 | |
| JP | S 58-145211 | A | 8/1983 | |
| JP | 2019-186178 | | 10/2018 | |
| JP | 2018-536397 | A | 12/2018 | |
| JP | 2019-110895 | A | 7/2019 | |
| JP | 2018-628237 | | 8/2019 | |
| JP | 2020-036592 | A | 3/2020 | |
| KR | 10-2018-0073626 | | 7/2018 | |
| KR | 10-2019-0049526 | | 5/2019 | |
| KR | 10-2020-0069112 | | 6/2020 | |
| KR | 10-2020-0128747 | | 11/2020 | |
| KZ | 32931 | B | 7/2018 | |
| KZ | 33237 | B | 11/2018 | |
| RU | 2 714 480 | C2 | 2/2020 | |
| WO | WO 2017/068098 | A1 | 4/2017 | |
| WO | WO 2018/206618 | | 11/2018 | |

OTHER PUBLICATIONS

Translation of DE 10103537 A1 (Year: 2002).*
Translation of Jp S 57-176706 A (Year: 1982).*
International Preliminary Report on Patentability and Written Opinion issued Nov. 24, 2022 in PCT/EP2021/062118, 8 pages.
Japanese Office Action issued Mar. 4, 2024 in 2022-563040 (with English translation), citing documents 15, 16 and 17 therein, 7 pages.
International Search Report & Written Opinion issued Aug. 6, 2021 in PCT/EP2021/062118, filed on May 7, 2021, citing documents 1-5 & 15-19 therein, 15 pages.
Japan Office Action issued Nov. 9, 2023 in Japanese Patent Application No. 2022-563040 (submitting English Translation only), citing references 15 and 16 therein, 3 pages.
Russian Search Report issued Apr. 21, 2023 in Russian Patent Application No. 2022132482 (with English Translation), citing references 15-17 therein, 4 pages.
Combined Chinese Office Action and Search Report issued Apr. 24, 2025, in corresponding Chinese Patent Application No. 202180028517.X (with English Translation) citing documents 15-17 therein, 19 pages.
Japanese Office Action issued Jul. 22, 2025 in corresponding Japanese Patent Application No. 2024-137607, 4 pages, citing documents 15-17 therein.
Notice of Allowance dated Oct. 21, 2025, issued in corresponding Korean patent application No. 10-2022-7038955 (with English translation) (citing documents 1-4).

* cited by examiner

AEROSOL-GENERATING DEVICE WITH SLIDING CONTACTS FOR MULTIPLE INDUCTION COILS

The present invention relates to an aerosol-generating device.

It is known to provide an aerosol-generating device for generating an inhalable vapor. Such devices may heat aerosol-forming substrate to a temperature at which one or more components of the aerosol-forming substrate are volatilised without burning the aerosol-forming substrate. Aerosol-forming substrate may be provided as part of an aerosol-generating article. The aerosol-generating article may have a rod shape for insertion of the aerosol-generating article into a cavity, such as a heating chamber, of the aerosol-generating device. A heating element may be arranged in or around the heating chamber for heating the aerosol-forming substrate once the aerosol-generating article is inserted into the heating chamber of the aerosol-generating device. The heating arrangement may be an induction heating arrangement and comprise an induction coil and a susceptor.

It would be desirable to provide an aerosol-generating device with variable heating of the aerosol-forming substrate of the aerosol-generating article. It would be desirable to provide an aerosol-generating device with variable heating zones. It would be desirable to provide an aerosol-generating device with switchable heating zones. It would be desirable to provide an aerosol-generating device with the option of heating zones or of having a uniform heating of the aerosol-forming substrate of the aerosol-generating article.

According to an embodiment of the invention there is provided an aerosol-generating device. The aerosol-generating device may comprise at least two heating arrangements. Each heating arrangement may comprise a heating coil, a first contact, a second contact and a third contact. The first contact may be arranged contacting a distal end of the heating coil. The second contact may be arranged contacting a proximal end of the heating coil. The third contact may be arranged contacting the heating coil between the first contact and the second contact. The aerosol generating device may further comprise a sliding arrangement. The heating coils of the heating arrangements may be arranged side by side parallel to a longitudinal axis of the aerosol-generating device. The sliding arrangement may be arranged adjacent the heating coils and configured to slide parallel to the longitudinal axis of the aerosol-generating device and parallel to the heating coils. The third contacts of the heating arrangements may be mounted on the sliding arrangement. An electrical contact point between each third contact and each respective heating coil may be adaptable by sliding the sliding arrangement.

According to an embodiment of the invention there is provided an aerosol-generating device. The aerosol-generating device comprises at least two heating arrangements. Each heating arrangement comprises a heating coil, a first contact, a second contact and a third contact. The first contact is arranged contacting a distal end of the heating coil. The second contact is arranged contacting a proximal end of the heating coil. The third contact is arranged contacting the heating coil between the first contact and the second contact. The aerosol generating device further comprises a sliding arrangement. The heating coils of the heating arrangements are arranged side by side parallel to a longitudinal axis of the aerosol-generating device. The sliding arrangement is arranged adjacent the heating coils and configured to slide parallel to the longitudinal axis of the aerosol-generating device and parallel to the heating coils. The third contacts of the heating arrangements are mounted on the sliding arrangement. An electrical contact point between each third contact and each respective heating coil is adaptable by sliding the sliding arrangement.

Due to the aerosol-generating device having at least two heating arrangements, multiple heating zones are created for heating the aerosol-forming substrate of an aerosol-generating article inserted into the cavity of the aerosol-generating device. Each individual heating arrangement comprises at least two separate heating zones. Thus, the at least two heating arrangements having at least two separate heating zones each to create a total of at least four separate heating zones. Additionally, the size of the heating zones can be modified by the sliding arrangement. By sliding the third contacts of the heating arrangements by means of the sliding arrangement, the electrical contact points at which the third contacts of the heating arrangements contact the respective heating coils of the heating arrangements is adaptable. The size of the heating zones of the heating arrangement depends upon the electrical contact point of the third contact with the heating coil of this heating arrangement.

As used herein, the terms ‘proximal’ and ‘distal’ are used to describe the relative positions of components, or portions of components, of the aerosol-generating device in relation to the direction in which a user draws on the aerosol-generating device during use thereof.

The first, second and third contacts are all electrical contacts. The first and second contacts may be fixed contacts. In other words, the first and second contacts are preferably not movable. The first and second contacts may electrically contact respective distal and proximal ends of the heating coil of a heating arrangement. The first and second contacts may be fixed to the ends of the heating coil by any known means, exemplarily by soldering.

The third contact may be configured as a movable contact. Exemplarily, the first contact may be configured as a sliding contact.

The heating arrangements may be configured as induction heating arrangements. In this case, the heating coil of the heating arrangement is configured as an induction coil. In the embodiments, in which the heating coil of the heating arrangement is configured as an induction coil, the device further comprises an DC/AC converter to convert the DC battery power to an alternating current (AC) that is provided to the induction coil.

The heating arrangements may comprise a common susceptor or wherein each heating arrangement may comprise a susceptor. In general, a susceptor is a material that is capable of generating heat, when penetrated by an alternating magnetic field. When located in an alternating magnetic field and if the susceptor is conductive, then eddy currents are induced by the alternating magnetic field. If the susceptor is magnetic, then typically another effect that contributes to the heating is commonly referred to hysteresis losses. If the susceptor is both magnetic and conductive, which often will be the case, then both hysteresis losses and eddy currents will contribute to heat generation. Hysteresis losses occur mainly due to magnetic domain block movement when the susceptor is penetrated by an alternating magnetic field.

The susceptor may be pin-shaped. The susceptor may be blade-shaped. If the susceptor is pin or blade-shaped, the susceptor is preferably arranged centrally within the cavity of the aerosol generating device. If an aerosol-generating article is inserted into the cavity of the aerosol-generating device, the susceptor may then penetrate into the aerosol-forming substrate of the aerosol-generating article.

Alternatively or additionally, the susceptor may be arranged at least partly surrounding the cavity of the aerosol-generating device. The susceptor may fully surround the cavity of the aerosol-generating device. The susceptor may in this case comprise multiple longitudinal susceptor elements, which may be arranged around the longitudinal axis of the cavity. The inner diameter of such a susceptor arrangement may correspond to or be slightly smaller than the outer diameter of an aerosol-generating article to be received within the cavity. If the aerosol-generating article is inserted into the cavity, the outer circumference of the aerosol-generating article may contact the susceptor. Consequently, the susceptor may hold the aerosol-generating article in the cavity. The susceptor may form the inner wall of the cavity.

Independently of the susceptor being configured for penetrating into the aerosol-generating article or for surrounding the aerosol-generating article, the susceptor may be configured as a common susceptor. In this case, the susceptor may extend through at least two of the heating arrangements. If the induction coil of one heating arrangement is activated, the portion of the susceptor being surrounded by this induction coil is heated only or predominantly. The portion of the susceptor adjacent to the portion of the susceptor being surrounded by this induction coil is not or only negligibly heated by the alternating magnetic field created by the induction coil. This adjacent portion of the susceptor may be heated only indirectly. Such indirect heating may be acceptable or even desired to create a heating gradient. If the induction coil of the other heating arrangement is activated, the portion of the susceptor being surrounded by the induction coil of this other heating arrangement is heated only or predominantly.

Alternatively, each heating arrangement might comprise an individual susceptor. Each individual susceptor may still be configured as a pin or blade-shaped susceptor for penetrating into the aerosol-generating article or a susceptor surrounding the cavity of the aerosol-generating device as described herein. One embodiment of such a susceptor is a susceptor which comprises individual portions, which are separated from each other by insulating layers or insulating portions. Exemplarily, for two heating arrangements, a susceptor may be provided which comprises two separate susceptor portions separated from each other by a single insulating layer or insulating portion. The overall shape of such a susceptor may be similar or identical to the susceptor shape of a common susceptor. However, the susceptor may comprise individual susceptor portions separated by the insulating layers. Preferably, the susceptor is arranged such that an individual susceptor portion is surrounded by an induction coil of a heating arrangement. As a consequence, if this induction coil of the heating arrangement is operated, only the susceptor portion surrounded by this induction coil is heated. The adjacent susceptor portion is separated from the heated susceptor portion by the insulating layer and thus not heated or only negligibly heated. If the other heating arrangement is operated, the process is vice versa.

The aerosol-generating device may further comprise a controller, wherein the controller may be configured to control supply of electrical current to the heating arrangements. The controller may be configured to control supply of alternating electrical current to the induction coils of the heating arrangements. The controller may be configured to control supply of alternating electrical current to a single induction coil of one heating arrangement at a time. The controller may be configured to control supply of alternating electrical current to a single induction coil for a predetermined time. Subsequently, the controller may be configured to control supply of alternating electrical current to a different induction coil of the different heating arrangement.

For each of the heating arrangements: the controller may be configured to supply electrical current (DC or AC, depending on whether the coils act as resistive heaters or inductors) at a given time only to a pair of the first, second and third contact. The effect of supplying electrical current (DC or AC, depending on whether the coils act as resistive heaters or inductors) between the different pairs of contact is that different heating zones can be created.

As described herein, the first contact is arranged contacting a distal end of the heating coil. The second contact is arranged contacting a proximal end of the heating coil. The third contact is arranged contacting the heating coil between the first contact and the second contact. This is the case for each heating arrangement. Each heating arrangement preferably comprises one heating coil. Preferably, the distal end of one heating coil of one heating arrangement is arranged adjacent to the proximal end of one heating coil of the next heating arrangement. The heating coils may be arranged side by side parallel to the longitudinal axis of the cavity and at least partly surrounding the cavity.

If electrical current (DC or AC, depending on whether the coils act as resistive heaters or inductors) is supplied between the first contact and the second contact of the heating arrangement, the full heating coil of this heating arrangement will be heated. If electrical current (DC or AC, depending on whether the coils act as resistive heaters or inductors) is supplied between the first contact and the third contact of the heating arrangement, the part of the heating coil between the first contact and the third contact will be heated. In this case, the part of the heating coil between the third contact and the second contact will not be heated, because no current will flow through this portion of the heating coil. If electrical current (DC or AC, depending on whether the coils act as resistive heaters or inductors) is supplied between the third contact and the second contact of the heating arrangement, the part of the heating coil between the third contact and the second contact will be heated. In this case, the part of the heating coil between the first contact and the third contact will not be heated, because no current will flow through this portion of the heating coil.

As a consequence, three different heating zones are created in each heating arrangement by the three different contacts, namely the first contact, the second contact and the third contact. Each heating zone is defined by the portion of the heating coil through which current flows. This portion of the heating coil surrounds a portion of the cavity of the aerosol-generating device. This portion of the cavity surrounded by the portion of the heating coil through which current flows is defined as a heating zone. Consequently, each heating arrangement comprises a large heating zone between the first contact and the second contact. This heating zone corresponds to the full length of the whole heating coil. Each heating arrangement comprises a second heating zone, which is smaller than the large first heating zone. The second heating zone is the portion of the heating coil between the first contact and the third contact. Each heating arrangement comprises a third heating zone, which is smaller than the large first heating zone. The third heating zone is the portion of the heating coil between the third contact and the second contact. The size of the second heating zone together with the size of the third heating zone corresponds to the size of the first heating zone.

In addition to each heating arrangement comprising three individual heating zones, the size at least of the second and third heating zones can be changed by the movable third contact. If the third contact is moved by means of the sliding arrangement, the spatial distance between the third contact and the first contact and the spatial distance between the third contact and the second contact changes. As a consequence, if electrical current (DC or AC, depending on whether the coils act as resistive heaters or inductors) flows through the heating coil between the first contact and the third contact, the shape of this second heating zone changes upon movement of the third contact. Similarly, if electrical current (DC or AC, depending on whether the coils act as resistive heaters or inductors) flows through the heating coil between the third contact and the second contact, the shape of this third heating zone changes upon movement of the third contact. Exemplarily, if the third contact is moved in the direction of the first contact, the second heating zone becomes small and the first heating zone becomes larger. This, again, is the case for each individual heating arrangement. Each individual heating arrangement comprises three distinct heating zones, the shape of which is modifiable by the movable third contact of each individual heating arrangement.

The sliding arrangement may be at least partly electrically conductive. This may enable supply of electrical current (DC or AC, depending on whether the coils act as resistive heaters or inductors) to the third contact via the sliding arrangement. The controller may be electrically connected with the sliding arrangement. The controller may be electrically connected with the first contact. The controller may be electrically connected with the second contact. The controller may be electrically connected with the third contact via the sliding arrangement.

The sliding arrangement may be longitudinal. The sliding arrangement may be arranged parallel to the longitudinal axis of the cavity. The sliding arrangement may be arranged parallel to the heating arrangements. The sliding arrangement may be rod-shaped. The sliding arrangement may comprise a motor. The controller may be configured to control operation of the motor. The motor may be an electric motor. The motor may be a linear motor. A change of shape of the heating zones of the heating arrangements may be facilitated by the controller operating movement of the sliding arrangement by operation of the motor. Each third contact may be securely mounted on the sliding arrangement. In other words, each contact may be mounted on the sliding arrangement such that the third contact is fixed on the sliding arrangement. The sliding arrangement may be configured to slide in the axial direction of the sliding arrangement. The axial direction of the sliding arrangement may be parallel to the longitudinal axis of the cavity. The longitudinal axis of the cavity may be identical or parallel to the longitudinal axis of the heating arrangements. The heating arrangements may each comprise the same longitudinal axis.

The third contact of an individual heating arrangement may be mounted on the sliding arrangement. Each third contact of each heating arrangement may be mounted on the sliding arrangement. Preferably, the third contacts of the heating arrangements are all mounted on the sliding arrangement such that the third contacts are moved together by moving the sliding arrangement. The third contacts may be equidistantly arranged on the sliding arrangement. Consequently, the change of shape of the individual heating zones of the heating arrangements is in this embodiment identical for each heating arrangement by movement of the third contacts of the heating arrangements by the sliding arrangement. It should be noted, however, that the controller may still individually control supply of electrical current (DC or AC, depending on whether the coils act as resistive heaters or inductors) between a pair of the first, second and third contacts of each heating arrangement separately. Consequently, even if the change of shape of the heating zones is the same for all of the heating arrangements in this embodiment, the controller may still individually supply electrical current (DC or AC, depending on whether the coils act as resistive heaters or inductors) to a single one of the heating zones of the heating arrangements or to multiple different heating zones of the different heating arrangements, as desired.

Alternatively, an individual sliding arrangement may be provided for each third contact of each heating arrangement. In this embodiment, the heating zones can individually be adjusted for each heating arrangement as desired. Additionally, the controller is preferably configured to supply electrical current (DC or AC, depending on whether the coils act as resistive heaters or inductors) individually to the individual heating zones of the heating arrangements, as desired.

By providing multiple heating zones and by enabling a change of shape of the heating zones, multiple heating regimes of the aerosol-forming substrate of the aerosol-generating article inserted into the cavity of the aerosol-generating device are enabled. In addition, if the controller is configured to individually supply electrical current (DC or AC, depending on whether the coils act as resistive heaters or inductors) to the heating zones of the heating arrangements by supplying electrical current (DC or AC, depending on whether the coils act as resistive heaters or inductors) to a pair of the first, second and third contacts of the heating arrangements, the number of potential heating regimes is increased so that an optimized heating regime can be chosen at a time.

Exemplarily, if the aerosol-generating article comprising aerosol-forming substrate is received in the cavity, it may be desirable to heat a proximal part of the aerosol-forming substrate first. The most proximal heating arrangement may therefore be used initially for heating. Within the most proximal heating arrangement, it may be contemplated to initially operate the second heating zone, which is the most proximal heating zone. To this end, the controller may supply electrical current (DC or AC, depending on whether the coils act as resistive heaters or inductors) between the first contact and the third contact of this most proximal heating arrangement. Subsequently, the size of the second heating zone may be increased by moving the third contact in the direction of the second contact. Finally, the third heating zone of this heating arrangement, being the most distal heating zone of this heating arrangement may be operated. For operating this third heating zone, the controller may supply electrical current (DC or AC, depending on whether the coils act as resistive heaters or inductors) between the third contact and the second contact of this most proximal heating arrangement.

After operating the most proximal heating arrangement, it may be chosen to operate the heating arrangement adjacent to the most proximal heating arrangement. In other words, it may be chosen to operate the heating arrangement that is adjacent to the distal end of the most proximal heating arrangement. Similar to operation of the most proximal heating arrangement, a desired sequence of the heating zones of this heating arrangement may be operated. This specific description of operation of heating zones is only exemplarily. Any kind of heating arrangements may be operated individually or together. Any number and shape of heating zones within each heating arrangement may be operated individually or together.

The aerosol-generating device may further comprise a communication interface for controlling the operation of the controller. The communication interface may be configured as a display. The communication interface may be configured as a touch display. The communication interface may comprise a wireless technology to enable communication of the communication interface with an external device such as a smartphone, smartwatch or tablet. The communication interface may be configured as or comprise a button. By means of the communication interface, a user may control operation of the controller. Exemplarily, a user may control operation of the movement of the sliding arrangement. As a consequence, a user may change the size of the heating zones within the heating arrangements.

Alternatively, operation of the controller may depend upon a predetermined program. This predetermined program may correspond to a desired heating profile of the aerosol-forming substrate of the aerosol-generating article. A user may choose the desired heating profile through the communication interface. Alternatively, the desired heating profile may be predetermined. As a further alternative or additionally, the desired heating profile may depend upon the type of aerosol-generating article received in the cavity. A user may input the type of aerosol-generating article or the type of aerosol-generating article may be detected by the aerosol-generating device and an appropriate heating profile may be chosen as a function of the detected type of aerosol-generating article.

The aerosol-generating device may comprise electric circuitry. The electric circuitry may comprise a microprocessor, which may be a programmable microprocessor. The microprocessor may be part of the controller. The electric circuitry may comprise further electronic components. The electric circuitry may be configured to regulate a supply of power to the heating arrangements. Power may be supplied to the heating arrangements continuously following activation of the aerosol-generating device or may be supplied intermittently, such as on a puff-by-puff basis. The power may be supplied to the heating arrangements in the form of pulses of electrical current. The electric circuitry may be configured to monitor the electrical resistance of the heating arrangements, and preferably to control the supply of power to the heating arrangements dependent on the electrical resistance of the heating arrangements.

The aerosol-generating device may comprise a power supply, typically a battery, within a main body of the aerosol-generating device. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. As an alternative, the power supply may be another form of charge storage device such as a capacitor. The power supply may require recharging and may have a capacity that enables to store enough energy for one or more usage experiences; for example, the power supply may have sufficient capacity to continuously generate aerosol for a period of around six minutes or for a period of a multiple of six minutes. In another example, the power supply may have sufficient capacity to provide a predetermined number of puffs or discrete activations of the heating arrangements.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user's lungs thorough the user's mouth. An aerosol-generating device may be a holder. The device may be an electrically heated smoking device. The aerosol-generating device may comprise a housing, electric circuitry, a power supply, a heating chamber and heating arrangements.

As used herein, the term 'aerosol-generating article' refers to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable.

The heating arrangements are preferably configured as an induction heating arrangements. The induction heating arrangements may comprise an induction coil and a susceptor. In general, a susceptor is a material that is capable of generating heat, when penetrated by an alternating magnetic field. When located in an alternating magnetic field, if the susceptor is conductive, then typically eddy currents are induced by the alternating magnetic field. If the susceptor is magnetic, then typically another effect that contributes to the heating is commonly referred to hysteresis losses. Hysteresis losses occur mainly due to the movement of the magnetic domain blocks within the susceptor, because the magnetic orientation of these will align with the magnetic induction field, which alternates. Another effect contributing to the hysteresis loss is when the magnetic domains will grow or shrink within the susceptor. Commonly all these changes in the susceptor that happen on a nano-scale or below are referred to as "hysteresis losses", because they produce heat in the susceptor. Hence, if the susceptor is both magnetic and electrically conductive, both hysteresis losses and the generation of eddy currents will contribute to the heating of the susceptor. If the susceptor is magnetic, but not conductive, then hysteresis losses will be the only means by which the susceptor will heat, when penetrated by an alternating magnetic field. According to the invention, the susceptor may be electrically conductive or magnetic or both electrically conductive and magnetic. An alternating magnetic field generated by one or several induction coils heat the susceptor, which then transfers the heat to the aerosol-forming substrate, such that an aerosol is formed. The heat transfer may be mainly by conduction of heat. Such a transfer of heat is best, if the susceptor is in close thermal contact with the aerosol-forming substrate.

The invention further relates to a system comprising an aerosol-generating device as described herein and an aerosol-generating article comprising aerosol-forming substrate as described herein.

Features described in relation to one embodiment may equally be applied to other embodiments of the invention.

Below, there is provided a non-exhaustive list of non-limiting examples. Any one or more of the features of these examples may be combined with any one or more features of another example, embodiment, or aspect described herein.

Example A: Aerosol-generating device comprising:

at least two heating arrangements, each heating arrangement comprising:

a heating coil, a first contact, a second contact and a third contact, wherein the first contact is arranged contacting a distal end of the heating coil, wherein the second contact is arranged contacting a proximal end of the heating coil, wherein the third contact is arranged contacting the heating coil between the first contact and the second contact, and a sliding arrangement, wherein the heating coils of the heating arrangements are arranged side by side parallel to a longitudinal axis of the aerosol-generating device, wherein the sliding arrangement is arranged adjacent the heating coils and configured to slide parallel to the longitudinal axis of the aerosol-generating device and parallel to the heating coils, wherein the third contacts of the heating arrangements are mounted on the sliding arrangement, and wherein an electrical contact point between each third contact and each respective heating coil is adaptable by sliding the sliding arrangement.

Example B: Aerosol-generating device according to example A, wherein the heating arrangements are configured as induction heating arrangements.

Example C: Aerosol-generating device according to example B, wherein the heating arrangements comprise a common susceptor or wherein each heating arrangement comprises a susceptor.

Example D: Aerosol-generating device according to any of the preceding examples, wherein the heating coils are configured as induction coils.

Example E: Aerosol-generating device according to any of the preceding examples, wherein each third contact is configured as a sliding contact.

Example F: Aerosol-generating device according to any of the preceding examples, wherein the aerosol-generating device further comprises a controller, wherein the controller is configured to control supply of electrical current to the heating arrangements.

Example G: Aerosol-generating device according to example F, wherein for each of the heating arrangements: the controller is configured to supply electrical current at a given time only to a pair of the first, second and third contact.

Example H: Aerosol-generating device according to example F or G, wherein the sliding arrangement is at least partly electrically conductive and wherein the controller is electrically connected with the sliding arrangement.

Example I: Aerosol-generating device according to any of examples F to H, wherein the aerosol-generating device further comprises a communication interface for controlling the operation of the controller.

Example J: Aerosol-generating device according to example I, wherein the communication interface is configured as a button or as a wireless communication interface for communicating with an external device.

Example K: Aerosol-generating device according to any of the preceding examples, wherein the aerosol-generating device further comprises a motor, preferably an electric linear motor, and wherein the motor is operationally coupled with the sliding arrangement to facilitate the sliding movement of the sliding arrangement.

Example L: Aerosol-generating device according to any of the preceding examples, wherein the aerosol-generating device further comprises a cavity for receiving an aerosol-generating article comprising aerosol-forming substrate.

Example M: Aerosol-generating device according to example L, wherein the heating coils are arranged side by side parallel to the longitudinal axis of the cavity and at least partly surrounding the cavity.

Example N: Aerosol-generating device according to example M and any of examples F to I, wherein heating zones are created by the heating coils at least partly surrounding the cavity and by the controller supplying electrical current to the heating arrangements, wherein the area of the heating zones is adaptable by sliding the sliding arrangement.

Example O: System comprising an aerosol-generating device according to any of the preceding examples and an aerosol-generating article comprising aerosol-forming substrate.

The invention will be further described, by way of example only, with reference to the accompanying drawings in which.

Figure 1:
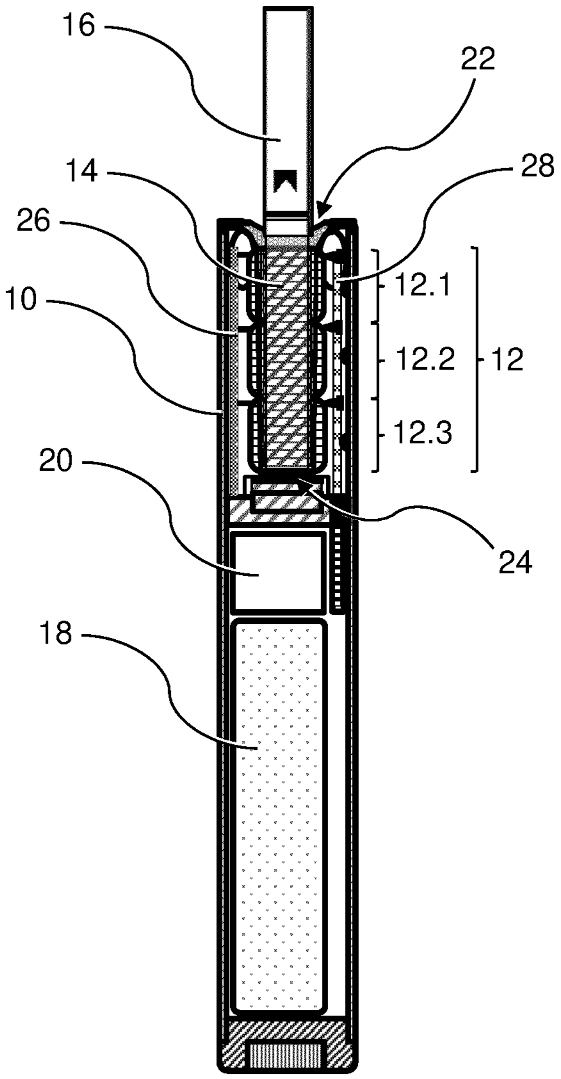
FIG. 1 shows an embodiment of the aerosol-generating device.

FIG. 1 shows an aerosol-generating device according to the invention. The aerosol-generating device comprises a housing 10. Within the housing 10, heating arrangements 12 are arranged. Exemplarily, a first heating arrangement 12.1, a second heating arrangement 12.2 and a third heating arrangement 12.3 are shown in the embodiment of FIG. 1. However, the number of heating arrangements 12 is not fixed and can be adapted accordingly. The individual heating arrangements 12 will be described in more detail with reference to FIGS. 2A-2D and 3.

The heating arrangements 12 are arranged surrounding a cavity 14 of the device. The cavity 14 is configured as a heating chamber. The cavity 14 is arranged near the proximal end of the device. The cavity 14 is configured for receiving an aerosol-generating article 16 comprising aerosol-forming substrate. In the embodiment shown in FIG. 1, an aerosol-generating article 16 is received in the cavity 14. The heating arrangements 12 are configured for heating the aerosol-forming substrate of the aerosol-generating article 16.

The aerosol-generating device further comprises a power supply in the form of a battery 18. The battery 18 is configured for supplying electrical current to the heating arrangements 12. A controller 20 is provided for controlling supply of electrical current from the battery 18 to the heating arrangements 12. The electrical current is supplied in the form of an electrical current, DC or AC, depending on whether the coils act as resistive heaters or as inductive coils. In the case the coils act as inductive coils, the device also comprises a DC/AC converter (not shown), to convert the DC current from the battery to an alternating current.

The heating arrangements 12 extend over the longitudinal length of the cavity 14. The first heating arrangement 12.1 is arranged adjacent the proximal end of the cavity 22 and surrounds the proximal end of the cavity 22. The proximal end of the cavity 22 is open for insertion of the aerosol-generating article 16. The third heating arrangement 12.3 is arranged around the distal end of the cavity 24 and surrounds the distal end of the cavity 24. At the end face of the distal end of the cavity 24, a base of the cavity 14 is arranged. The second heating arrangement 12.2 is arranged between the first heating arrangement 12.1 and the third heating arrangement 12.3.

The heating arrangements 12 each have a hollow cylindrical shape to surround the hollow cylindrical cavity 14.

The heating arrangements 12 are preferably mounted by means of a mounting element 26. The mounting element 26 is elongate. The mounting element 26 extends parallel to the longitudinal axis of the aerosol-generating device. The heating arrangements 12 also extend parallel to the longitudinal axis of the aerosol-generating device. Preferably, the longitudinal axes of the heating arrangements 12 and of the aerosol-generating device are identical.

The aerosol-generating device further comprises a sliding arrangement 28. The sliding arrangement 28 is elongate. The sliding arrangement 28 extends parallel to the longitudinal axis of the aerosol-generating device. The sliding arrangement 28 is arranged opposite of the mounting element 26. The sliding arrangement 28 is arranged on one side of the cavity 14 distanced from the cavity 14 in a radial direction. The mounting element 26 is arranged on the other side of the cavity 14 distanced from the cavity 14 in an opposite radial direction relative to the radial direction of the sliding arrangement 28.

FIGS. 2A-2D show the heating arrangements 12, the mounting element 26 and the sliding arrangement 28 in more detail. FIGS. 2A-2D, operation of the heating arrangements 12 is shown.

Figures 2A, 2B, 2C, 2D:
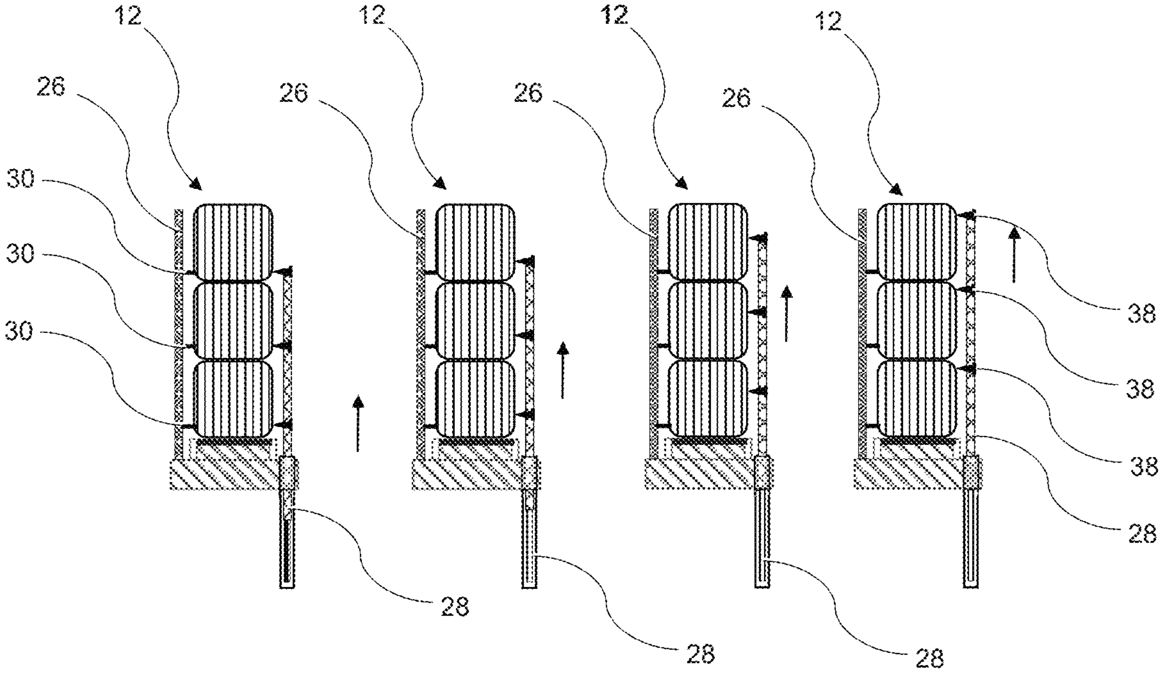
FIGS. 2A-2D show operation of heating arrangements of the aerosol-generating device.

As shown in FIGS. 2A-2D, exemplarily in FIG. 2A, the heating arrangements 12 are mounted on the mounting element 26. Exemplarily, the mounting element 26 comprises a mounting strut 30 for each heating arrangement. The mounting strut 30 may hold the heating arrangement at any desired position. The mounting strut 30 and the mounting element 26 may be one or more of electrically conductive or may comprise an electrically conductive portion or may comprise an electrically conductive wire or may comprise an electrically conductive contact. Preferably, each mounting strut 30 and the mounting element 26 comprise two separate electrically conductive pathways for each heating arrangement. One of these electrically conductive pathways is connected to the battery 18 or to the controller 20 and to a distal end of the respective heating arrangement. The other of these electrically conductive pathways is also connected to the battery 18 or to the controller 20 and to the proximal end of the respective heating arrangement. One of the electrically conductive pathways comprises or contacts the first contact 34 of the respective heating arrangement and the other of the electrically conductive pathways comprises or contacts the second contact 36 of the respective heating arrangement.

Exemplarily, a first conductive pathway is provided and electrically connects the first contact 34 of the first heating arrangement 12.1 with the battery 18 or with the controller 20 via the mounting strut 30 adjacent the first heating arrangement 12.1 and via the mounting element 26. A second conductive pathway is provided and electrically connects the second contact 36 of the first heating arrangement 12.1 with the battery 18 or with the controller 20 via the mounting strut 30 adjacent the first heating arrangement 12.1 and via the mounting element 26. For the second heating arrangement 12.2, corresponding third and fourth conductive pathways may be provided and for the third heating arrangement 12.3, corresponding fifth and sixth conductive pathways may be provided.

Respective third contacts 38 of the heating arrangements 12 are mounted on the sliding arrangement 28. The sliding arrangement 28 is arranged parallel to the longitudinal axis of the cavity 14, which is at the same time the longitudinal axis of the heating arrangements 12. A third contact 38 is mounted on the sliding arrangement 28 for each heating arrangement. The third contact 38 establishes the electrical contact point between the induction coil 32 of the heating arrangement and the battery 18 or the controller 20 via the sliding arrangement 28. In the example shown in FIGS. 2A-2D, three third contacts 38 are provided for the three heating arrangements 12.

The respective first and second contacts of the heating arrangements 12 are fixed. These contacts are fixed on the mounting element 26. In other words, the mounting element 26, the mounting struts 30 and the first and second contacts of the respective heating arrangements 12 are fixed. In contrast, the third contacts 38 of the heating arrangements 12 are slidable along the longitudinal length of the heating arrangements 12 by means of the sliding movement of the sliding arrangement 28. The sliding movement of the sliding arrangement 28 can be facilitated by a motor, preferably an electric linear motor. The motor can be controlled by the controller 20. Control of the sliding arrangement 28 can be facilitated by the motor according to a predetermined regime, such as a function of the activation of the aerosol-generating device. Alternatively, the sliding movement of the sliding arrangement 28 can be facilitated by an actuator that is manually operated by the user.

Figure 3:
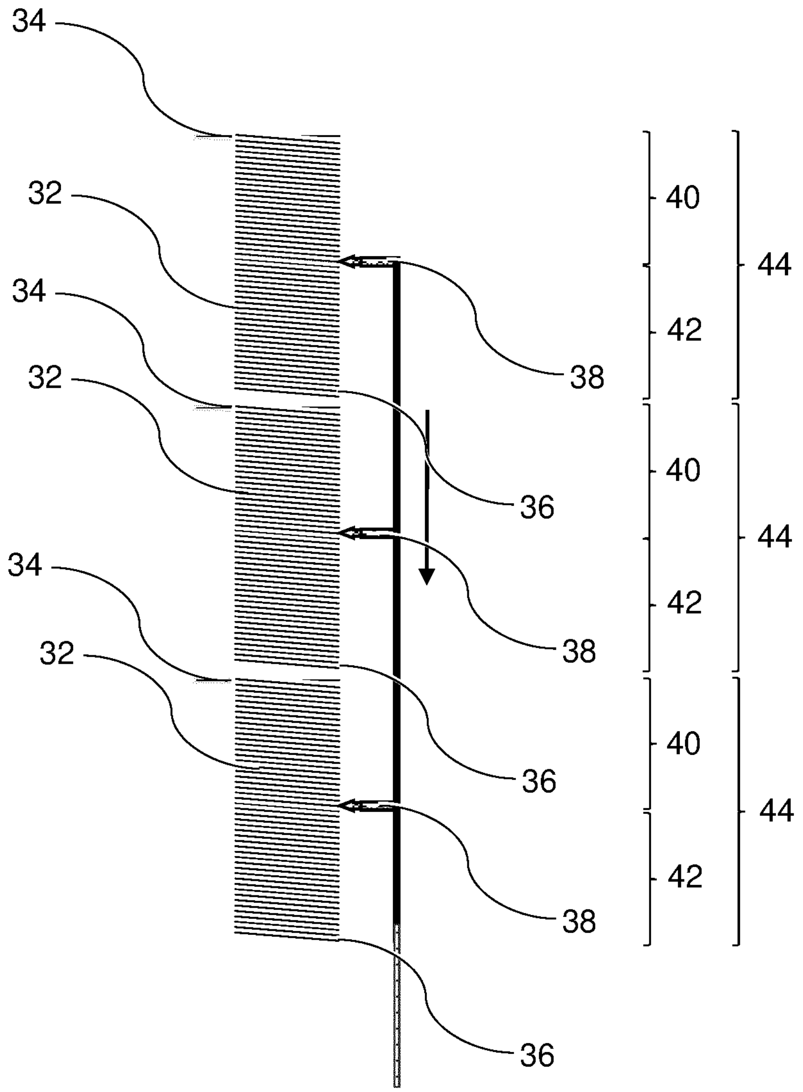
FIG. 3 shows the structure of the heating arrangements of the aerosol generating device.

Each heating arrangement comprises an induction coil 32 as shown in FIG. 3. The slidable third contact 38 is configured to contact the induction coil 32 of the respective heating arrangement. The third contact 38 is a sliding contact. The sliding arrangement 28 is electrically conductive. The third contact 38 of each heating arrangement is electrically connected with the battery 18 or with the controller 20 via the third contact 38 and the sliding arrangement 28. Electrical current (DC or AC, depending on whether the coils act as resistive heaters or inductors) is supplied to a pair of the first, second and third contacts 38 of each heating arrangement by the controller 20.

As exemplarily shown in FIG. 3, each heating arrangement comprises a first contact 34 at a proximal end of the heating arrangement, a second contact 36 at the distal end of the heating arrangement and the slidable third contact 38 between the first contact 34 and the second contact 36. Alternating electrical current might be supplied to the induction coil 32 between the first contact 34 and the third contact 38, as shown in FIG. 3. As a consequence, only this portion of the induction coil 32 will create an alternating magnetic field and a susceptor surrounded by this portion of the induction coil 32 will be heated. The part of the induction coil 32 between the third contact 38 and the second contact 36 with in this case not be supplied with an electrical current. As a consequence, this part of the induction coil 32 between the third contact 38 and the second contact 36 will not create an alternating magnetic field and a susceptor surrounded by this portion of the induction coil 32 will not be heated.

Supplying alternating electrical current between the first contact 34 and the third contact 38 is of course only exemplary. Alternatively, alternating electrical current might be supplied between the third contact 38 and between the second contact 36. As a further alternative, alternating electrical current might be supplied between the first contact 34 at the second contact 36. All of these different options are controlled by the controller 20. As shown in FIG. 3, all of the three heating arrangements 12 are controlled by the controller 20 such that alternating electrical current is supplied between the first contacts and the third contacts 38 of all of these heating arrangements 12 at the same time. This is also an example. Different pairs of contacts may be supplied with alternating electrical current for the different heating arrangements 12 differently. Also, only individual heating arrangements 12 may be supplied with alternating electrical current.

During operation, different heating regimes can be realized by the configuration and the operation of the heating arrangements 12 and the contacts and by the supply of alternating electrical current to the respective contacts.

The inner space of the cavity 14 surrounded by an individual induction coil 32 through which electrical current flows is a heating zone. Exemplarily, the inner space of the cavity 14 corresponding to an induction coil 32 between the first contact 34 and the third contact 38 is a first heating zone 40. For an individual heating arrangement, the first heating zone 40 is heated in the embodiment shown in FIG. 3. Within this first heating zone 40, an individual susceptor for this first heating zone 40 may be arranged. The susceptor can be pin or blade shaped and be arranged centrally within the cavity 14 or the susceptor can surround the cavity 14. Alternatively, a common susceptor is provided for all heating arrangements 12 as a pin or blade shaped susceptor being arranged centrally within the cavity 14 or as a susceptor surrounding the cavity 14.

The inner space of the cavity 14 corresponding to an induction coil 32 between the third contact 38 and the second contact 36 is a second heating zone 42. The inner space of the cavity 14 corresponding to an induction coil 32 between the first contact 34 and the second contact 36 is a third heating zone 44. The third heating zone 44 is the first heating zone 40 and the second heating zone 42.

The controller 20 is configured to control the supply of alternating electrical current to the first, second and third contacts 38 off each heating arrangement so that a desired heating zone is heated. In addition to choosing a suitable heating zone by the controller 20, the controller 20 is further configured to operate the sliding movement of the sliding arrangement 28 such that the size of the heating zones is modified. The size of the heating zones is modified due to the fact that the third contact 38 is slidable along the longitudinal length of the induction coil 32. By sliding the third contact 38 along the longitudinal length of the induction coil 32, the length of the induction coil 32 through which electrical current runs changes between the first contact 34 at the third contact 38 and between the third contact 38 at the second contact 36. In other words, changing the position of the third contact 38 by sliding the sliding arrangement 28 modifies the longitudinal length of the first heating zone 40 and of the second heating zone 42.

As an example, during initial operation of the aerosol-generating device, the first heating zone 40 of one or more heating arrangements 12 may be heated by the controller 20 controlling supply of alternating electrical current between the first contact 34 and the third contact 38. Subsequently, the shape of the first heating zone 40 may be gradually increased by the controller 20 sliding the sliding arrangement 28 in a distal direction so that the distance between the first contact 34 and the third contact 38 increases. Finally, the supply of alternating electrical current may be changed by the controller 20 from flowing between the first contact 34 and the third contact 38 to now flow between the third contact 38 and the second contact 36. As a consequence, the second heating zone 42 of one or more heating arrangements 12 may then be heated. This operation may optimize heating of the aerosol-forming substrate of an aerosol-generating article 16 received in the cavity 14 such that a homogeneous aerosol is generated.

The invention claimed is:

1. An aerosol-generating device, comprising:

at least two heating arrangements, each heating arrangement comprising: a heating coil, a first contact, a second contact, and a third contact, wherein the first contact is arranged contacting a distal end of the heating coil, wherein the second contact is arranged contacting a proximal end of the heating coil, and wherein the third contact is arranged contacting the heating coil between the first contact and the second contact; and a single common sliding arrangement, wherein the heating coils of the at least two heating arrangements are arranged side by side parallel to a longitudinal axis of the aerosol-generating device, wherein the single common sliding arrangement is arranged adjacent the heating coils and is configured to slide parallel to the longitudinal axis of the aerosol-generating device and parallel to the heating coils, wherein the third contacts of the at least two heating arrangements are mounted on the single common sliding arrangement, wherein an electrical contact point between each third contact and each respective heating coil is simultaneously adaptable by sliding the single common sliding arrangement, and wherein the third contacts of all of the heating arrangements are mounted on the single common sliding arrangement so that translation of the single common sliding arrangement simultaneously changes the electrical contact point between each third contact and its respective heating coil.

2. The aerosol-generating device according to claim 1, wherein the at least two heating arrangements are configured as induction heating arrangements.

3. The aerosol-generating device according to claim 2, wherein the at least two heating arrangements further comprise a common susceptor, or wherein each heating arrangement further comprises a susceptor.

4. The aerosol-generating device according to claim 1, wherein the heating coils are configured as induction coils.

5. The aerosol-generating device according to claim 1, wherein each third contact is configured as a sliding contact.

6. The aerosol-generating device according to claim 1, further comprising a controller, wherein the controller is configured to control supply of electrical current to the at least two heating arrangements.

7. The aerosol-generating device according to claim 6, wherein for each of the at least two heating arrangements the controller is further configured to supply electrical current at a given time only to a pair of the first, the second, and the third contacts.

8. The aerosol-generating device according to claim 6, wherein the single common sliding arrangement is at least partly electrically conductive, and wherein the controller is electrically connected with the single common sliding arrangement.

9. The aerosol-generating device according to claim 6, further comprising a communication interface configured to control operation of the controller.

10. The aerosol-generating device according to claim 9, wherein the communication interface is further configured as a button or as a wireless communication interface for communicating with an external device.

11. The aerosol-generating device according to claim 1, further comprising a motor, wherein the motor is operationally coupled with the single common sliding arrangement to facilitate sliding movement of the single common sliding arrangement.

12. The aerosol-generating device according to claim 11, wherein the motor is an electric linear motor.

13. The aerosol-generating device according to claim 1, further comprising a cavity configured to receive an aerosol-generating article comprising an aerosol-forming substrate.

14. The aerosol-generating device according to claim 13, wherein the heating coils are arranged side by side parallel to a longitudinal axis of the cavity and at least partly surrounding the cavity.

15. The aerosol-generating device according to claim 14, further comprising a controller, wherein the controller is configured to control supply of electrical current to the at least two heating arrangements, wherein heating zones are created by the heating coils at least partly surrounding the cavity and by the controller supplying electrical current to the at least two heating arrangements, and wherein an area of the heating zones is adaptable by sliding the single common sliding arrangement.

16. A system comprising the aerosol-generating device according to claim 1 and an aerosol-generating article comprising an aerosol-forming substrate.

* * * * *